(12) United States Patent
Smith et al.

(10) Patent No.: US 10,056,009 B2
(45) Date of Patent: Aug. 21, 2018

(54) TRAINING APPARATUS

(71) Applicant: CATERPILLAR INC., Peoria, IL (US)

(72) Inventors: Andrew John Smith, Ashbourne (GB); Christopher Erik Bright, Raleigh, NC (US); Justin Douglas Speichinger, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 204 days.

(21) Appl. No.: 15/022,523

(22) PCT Filed: Sep. 17, 2014

(86) PCT No.: PCT/US2014/056103
§ 371 (c)(1),
(2) Date: Mar. 16, 2016

(87) PCT Pub. No.: WO2015/042155
PCT Pub. Date: Mar. 26, 2015

(65) Prior Publication Data
US 2016/0232814 A1    Aug. 11, 2016

(30) Foreign Application Priority Data
Sep. 17, 2013    (GB) .................................. 1316507.1

(51) Int. Cl.
| | | |
|---|---|---|
| *G09B 9/04* | (2006.01) | |
| *G09B 19/16* | (2006.01) | |
| *G09B 9/042* | (2006.01) | |
| *G09B 9/05* | (2006.01) | |
| *G09B 5/02* | (2006.01) | |

(52) U.S. Cl.
CPC ............. *G09B 19/167* (2013.01); *G09B 5/02* (2013.01); *G09B 9/042* (2013.01); *G09B 9/05* (2013.01)

(58) Field of Classification Search
CPC ........ G09B 19/16; G09B 9/042; G09F 19/167
See application file for complete search history.

(56) References Cited

U.S. PATENT DOCUMENTS

| | | |
|---|---|---|
| 2002/0087296 A1 | 7/2002 | Wynn |
| 2008/0070227 A1 | 3/2008 | Rauch |
| 2008/0206719 A1 | 8/2008 | Johnsson et al. |
| 2009/0011389 A1 | 1/2009 | Sizov |
| 2013/0180744 A1 | 7/2013 | Favreau et al. |

FOREIGN PATENT DOCUMENTS

| | | |
|---|---|---|
| EP | 1895488 A2 | 3/2008 |
| JP | 10-105041 A | 4/1998 |
| WO | WO 2006/015592 A1 | 2/2006 |
| WO | WO 2007/109625 A2 | 9/2007 |
| WO | WO 2011/067456 A1 | 6/2011 |
| WO | WO 2012/028883 A1 | 3/2012 |

OTHER PUBLICATIONS

European Patent Office, International Search Report in International Patent Application No. PCT/US2014/056103, dated Jan. 13, 2015, 3 pp.
United Kingdom Intellectual Property Office, Search Report in United Kingdom Patent Application No. GB1316507.1, dated Mar. 17, 2014, 1 p.

*Primary Examiner* — Omkar Deodhar

(57) ABSTRACT

The present disclosure relates to a training apparatus for providing different training levels to an operator of a machine. Known training systems are standalone training systems and separate from the machine. The training system is provided onboard the machine and allows for different training of the operator according to the operator's expertise.

20 Claims, 7 Drawing Sheets

TRAINING APPARATUS

CROSS-REFERENCE TO RELATED APPLICATIONS

This application is a national phase application of International Patent Application No. PCT/US2014/056103, filed Sep. 17, 2014, which claims priority to United Kingdom Patent Application No. 1316507.1, filed Sep. 17, 2013, both of which are incorporated by reference herein in their entireties for all purposes.

TECHNICAL FIELD

The present disclosure relates to a training apparatus, and more specifically to the training apparatus for providing different levels of training to an operator of a machine.

BACKGROUND

Usually, an operator of a machine is required to be provided with training for operating the machine. The training may also be provided for performing a required operation using one or more implements of the machine. Depending on a skill level of the operator, such as novice, intermediate or experienced, the training may have different levels with different complexities. Known methods of providing the training include use of a dedicated simulation system. The simulation system may provide a virtual machine with one or more virtual implements for providing the required training to the operator. The simulation system for providing the training to the operator of the machine is usually a standalone system.

U.S. Patent Application Publication No. 2008206719 discloses a training system for training a person while operating a vehicle. The vehicle includes a control system for receiving vehicle operating commands from the person for controlling the vehicle. The training system includes means for simulating at least one of a state of the vehicle and the environment to which the vehicle is subjected. The simulated state is at least one of a possible real state of the vehicle and the environment which is different from the at least one of the actual state of the vehicle and the environment. The training system includes means for calculating vehicle command signals using the vehicle operating commands and the simulation means. The training system also includes means for transmitting the vehicle command signals to at least one controllable component of the vehicle for controlling the vehicle so as to cause the vehicle to respond to the vehicle operating commands in a way that corresponds to the state simulated by the simulation means instead of the at least one of the actual state of the vehicle and the environment.

SUMMARY OF THE DISCLOSURE

In one aspect of the present disclosure, a training apparatus on board a machine is provided. The training apparatus includes a feedback representation module configured to provide a feedback to an operator of the machine. The training apparatus also includes a selector module configured to enable the operator to select at least one training level. The training level includes a simulation training level, wherein the training apparatus provides a training to operate the machine when the machine is in a power off mode. The training level also includes a direct feedback training level, wherein the training apparatus provides the feedback to the operator when the machine is running The training apparatus further includes a corrective training level, wherein the training apparatus provides the feedback about a corrective action performed based on an operator's input when the machine is running Other features and aspects of this disclosure will be apparent from the following description and the accompanying drawings.

DETAILED DESCRIPTION

Figure 1:
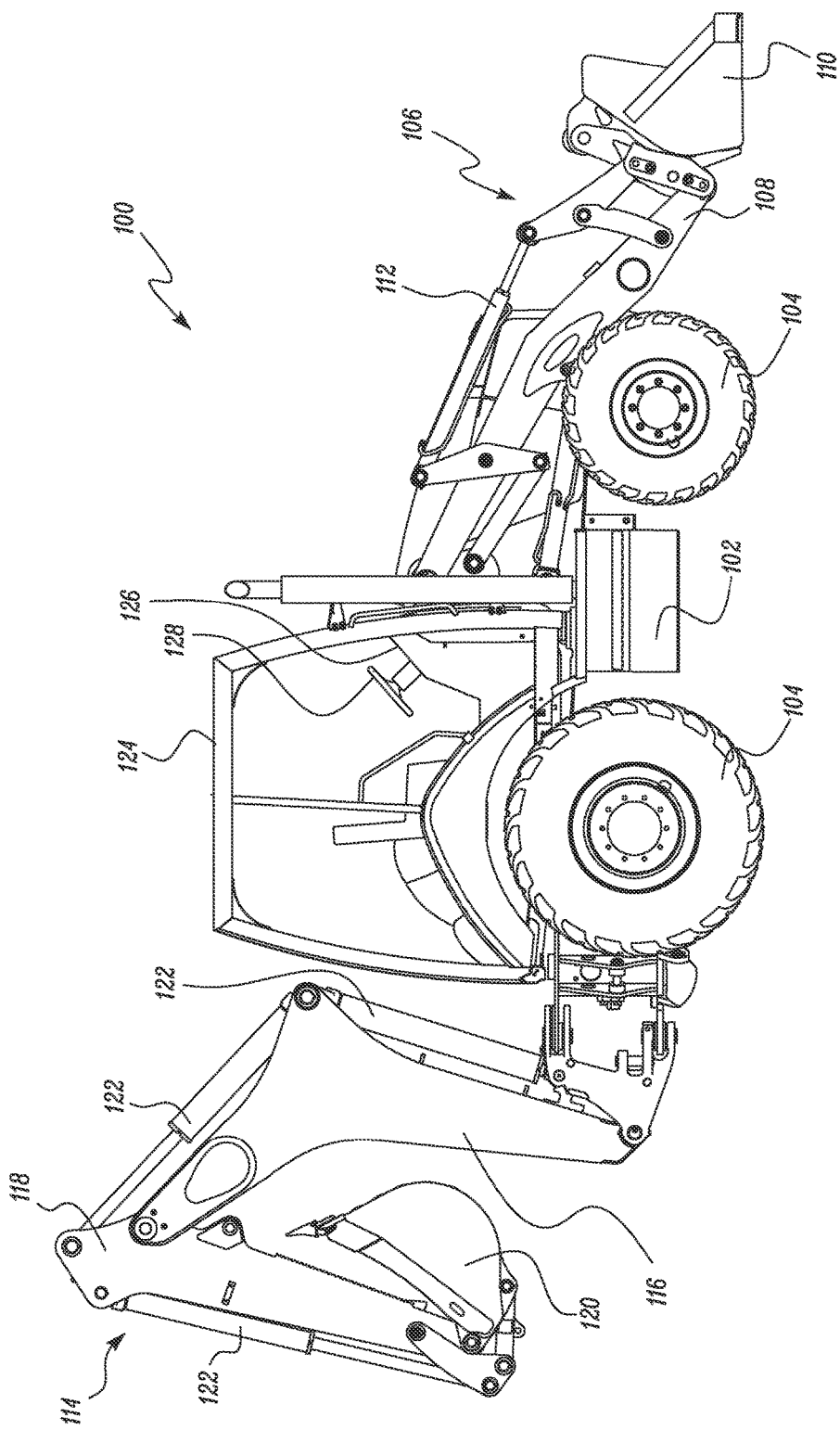
FIG. 1 is an exemplary machine according to one embodiment of the present disclosure.

Wherever possible, the same reference numbers will be used throughout the drawings to refer to the same or the like parts. Referring to FIG. 1, an exemplary machine 100 is illustrated. More specifically, the machine 100 is a backhoe loader. Alternatively, the machine 100 may be any machine including, but not limited to, a wheel loader, an excavator, a shovel, a dozer, a mining truck, an articulated truck, a track type tractor, a forklift, a crane and so on. The machine 100 may be any machine known in the art associated with industries including, but not limited to, agriculture, transportation, mining, construction, forestry and material handling.

The machine 100 includes a frame 102 and/or a chassis 102. A power source (not shown) is provided on the frame 102 of the machine 100. The power source may be any power source known in the art such as an internal combustion engine, an electric motor, power storage device like batteries and a hybrid engine. The power source is configured to provide power to the machine 100 for operational and mobility requirements. The machine 100 includes a set of ground engaging members 104 such as wheels or track. The ground engaging members 104 are configured to provide mobility to the machine 100. The machine 100 also includes a drivetrain (not shown) coupled to the power source and the ground engaging members 104. The drivetrain may include a transmission system having one or more gears, shafts, differentials, torque convertor, hydraulic pump or motor and so on. The drivetrain may be configured to transmit motive power from the power source to the ground engaging members 104.

The machine 100 includes one or more implements and associated components pivotally coupled to the frame 102. In the illustrated embodiment, a front implement arrangement 106 is provided at a front section of the machine 100. The front implement arrangement 106 includes a front arm 108 pivotally coupled to the frame 102. An implement such as a front bucket 110 is pivotally affixed to the front arm 108.

The front implement arrangement 106 also includes hydraulic and/or pneumatic cylinders 112 for providing a required spatial movement to the front arm 108 and the front bucket 110.

Additionally, a rear implement arrangement 114 is provided at a rear section of the machine 100. The rear implement arrangement 114 includes a boom 116 pivotally coupled to the frame 102. The rear implement arrangement 114 includes a rear arm 118 pivotally coupled to the boom 116. An implement such as a rear bucket 120 is pivotally affixed to the rear arm 118. The rear implement arrangement 114 also includes hydraulic and/or pneumatic cylinders 122 for providing a required spatial movement to the boom 116, the rear arm 118 and the rear bucket 120.

It should be noted that the front and rear buckets 110, 120 may be replaced by any other implement as per system requirements. For example, the implement may include an auger, a blade, a fork, a hammer, a ripper, any other implement known to one of skilled in the art or a combination thereof. The front and rear implement arrangements 106, 114 are configured for performing tasks such as earth moving, excavation, digging, demolition and the like. Further, the front and rear implement arrangements 106, 114 may be controlled electrically, mechanically, hydraulically, pneumatically or by a combination thereof.

The machine 100 also includes an operator cabin 124 provided on the frame 102 of the machine 100. The operator cabin 124 includes an operator interface 126. The operator interface 126 may include one or more input devices 128 like pedals, steering, joystick, knobs, levers, switches, display devices and so on. The input device 128 may be configured for operating and controlling one or more parameters of the front and rear implement arrangements 106, 114 and/or the machine 100. The parameters related to the front and rear implement arrangements 106, 114 may include a tilt of the implement, extension length of the boom 116 and/or the hydraulic cylinders 112, 122, a height of the implement in a raised or a lowered position and so on. The parameters related to the machine 100 may include the drivetrain, the transmission, a gear position, an engine speed, an output torque, a linear speed of the machine 100 on ground, a steering angle, pressure in the hydraulic cylinders 112, 122 and so on.

Figure 2:
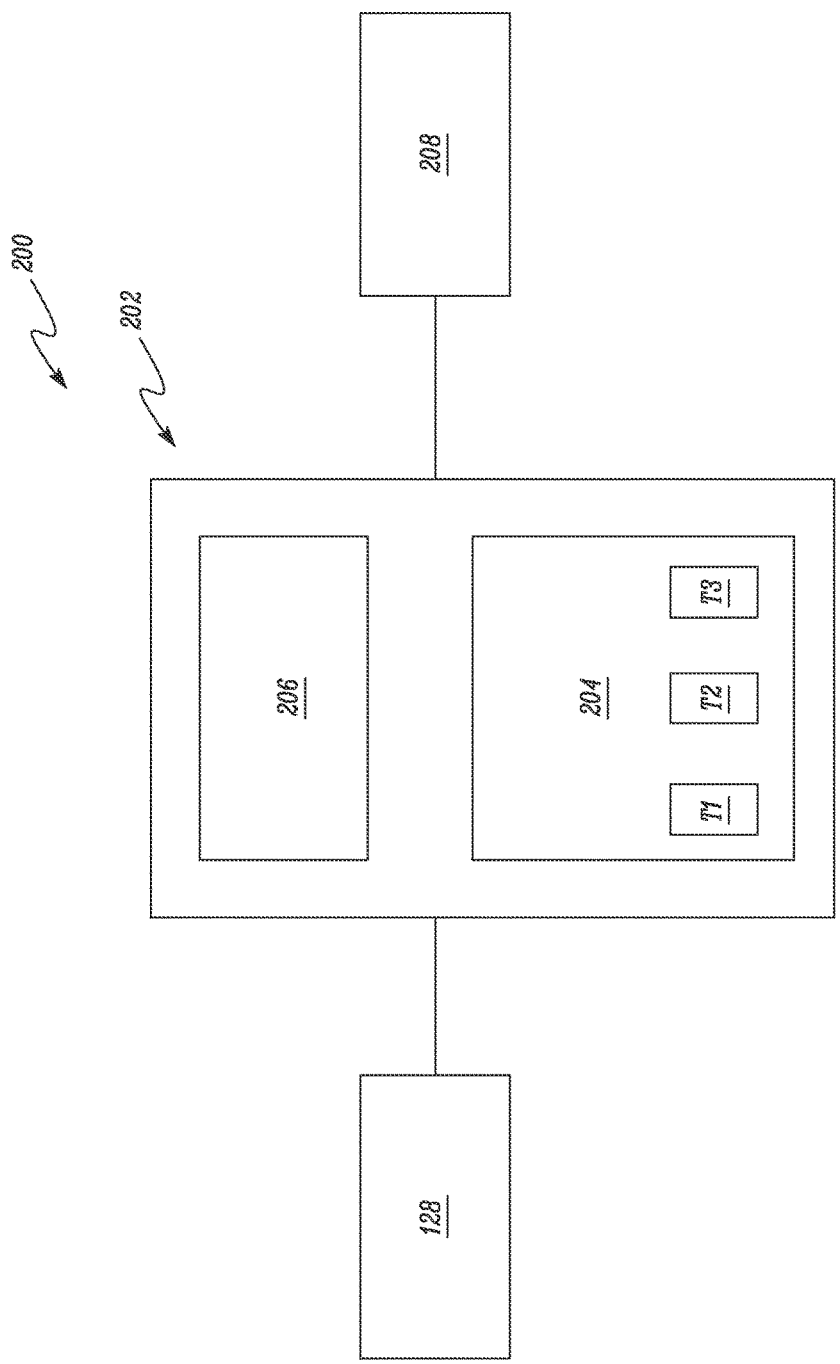
FIG. 2 is a block diagram of a training apparatus.

The present disclosure relates to a training apparatus provided within the operator cabin 124. FIG. 2 illustrates a block diagram 200 of a training apparatus 202 provided on board the machine 100. The training apparatus 202 is configured to provide different training levels to an operator of the machine 100. In the illustrated embodiment, the training apparatus 202 is configured to provide three different training levels. The training levels include a simulation training level T1, a direct feedback training level T2 and a corrective training level T3.

The simulation training level T1 is configured to provide training to the operator to operate the machine 100 when the machine 100 is in a power off mode. The direct feedback training level T2 is configured to provide a feedback to the operator when the machine 100 is running The corrective training level T3 is configured to provide the feedback to the operator about a corrective action performed based on an operator input when the machine 100 is running The training levels will be explained in detail later. It should be noted that the training levels disclosed herein are exemplary. Further, number, complexity, configuration and nomenclature of the training levels may vary and may not limit the scope of the disclosure.

The training apparatus 202 includes a selector module 204. The selector module 204 may include any one or a combination of devices like switches, levers, knobs, display screens and so on. The selector module 204 enables the operator of the machine 100 to select any one of the simulation training level T1, the direct feedback training level T2 and the corrective training level T3.

The training apparatus 202 further includes a feedback representation module 206 communicably coupled to the selector module 204. In one embodiment, the feedback representation module 206 may also be physically coupled to the selector module 204. The feedback representation module 206 may include at least one of a display screen, an audio device, indicator lights, a tactile feedback device and the like. The feedback representation module 206 is configured to provide the feedback to the operator of the machine 100 based on the selected training level. In one embodiment, the feedback representation module 206 is an onscreen display device already provided inside the operator cabin 124.

In one embodiment, the feedback representation module 206 and the selector module 204 may be integrated into one single unit. In this embodiment, the selector module 204 may be a touchscreen device.

Accordingly, the selector module 204 may display an alphabetical/alphanumerical list or icons representing the different training levels in a selector mode. On selection of a required training level by the operator, the selector mode may change to a feedback representation mode. In the feedback representation mode, the selector module 204 may function as the feedback representation module 206 to provide the feedback to the operator of the machine 100 based on the selected training level.

The training apparatus 202 is communicably coupled to a control system 208 of the machine 100. The control system 208 is further communicably coupled to the power source, the ground engaging members 104, the drivetrain, the front and rear implement arrangements 106, 114 and/or other components of the machine 100. The control system 208 may be configured to determine one or more parameters associated with the operation of the machine 100.

For example, in one embodiment, the control system 208 is communicably coupled to one or more sensors such as positional sensors, pressure sensors, flow sensors and so on placed at various positions on the machine 100 and are configured to provide the spatial position of the front and rear implement arrangements 106, 114. Additionally, the control system 208 is also configured to associate the spatial position of the front and rear implement arrangements 106, 114 based on a position of the input devices 128 on the operator interface 126.

Further, the control system 208 may be configured to determine a desired operational time for a required operation to be completed by the front and/or rear implement arrangements 106, 114 of the machine 100. The control system 208 may look up a database or any external or internal data storage means (not shown) to determine the desired operational time for performing the required operation. Also, the control system 208 may be configured to determine a sequence of commands/inputs required on the operator interface 126 to perform the required operation.

In an embodiment, the control system 208 may be communicably coupled to one or more sensors associated with the power source to determine one or more parameters of the power source. The parameters may include the engine speed, the output torque, an intake manifold temperature, an intake manifold pressure, engine cylinder pressure, an exhaust valve temperature, fuel consumption and the like. Further, the control system 208 may also be communicably coupled to one or more sensors of the drivetrain, the ground engaging members 104 and/or associated components to determine one or more parameters. The one or more parameters may include a status of an engaged gear, a speed of the machine 100, steering angle and the like.

Thus, the control system 208 may also be configured to determine one or more parameters of the machine 100, such as the engine speed, a throttle input, a brake selection, a gear selection, hydraulic pump pressure, hydraulic pump displacement or flow, hydraulic valve displacements or commands per function, cylinder pressures and so on, while the front and/or rear implement arrangements 106, 114 perform the required operation.

Based on the selected training level, the training apparatus 202 is configured to provide the training and/or the feedback to the operator. The simulation training level T1, the direct feedback training level T2 and the corrective training level T3 will now be explained in detail.

Figure 3:
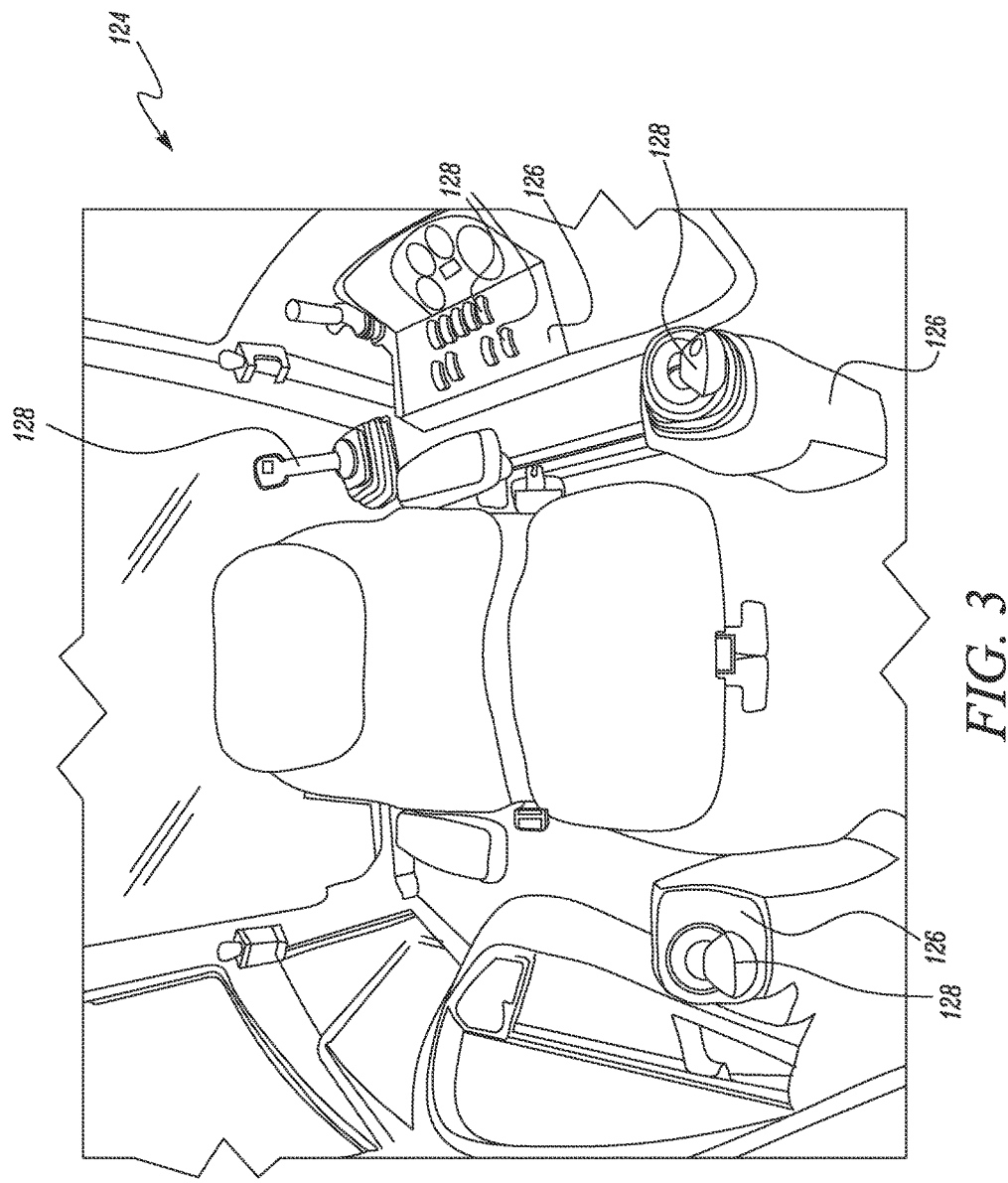
FIG. 3 is an interior view of an operator cabin showing various input devices provided on an operator interface.
Figure 4:
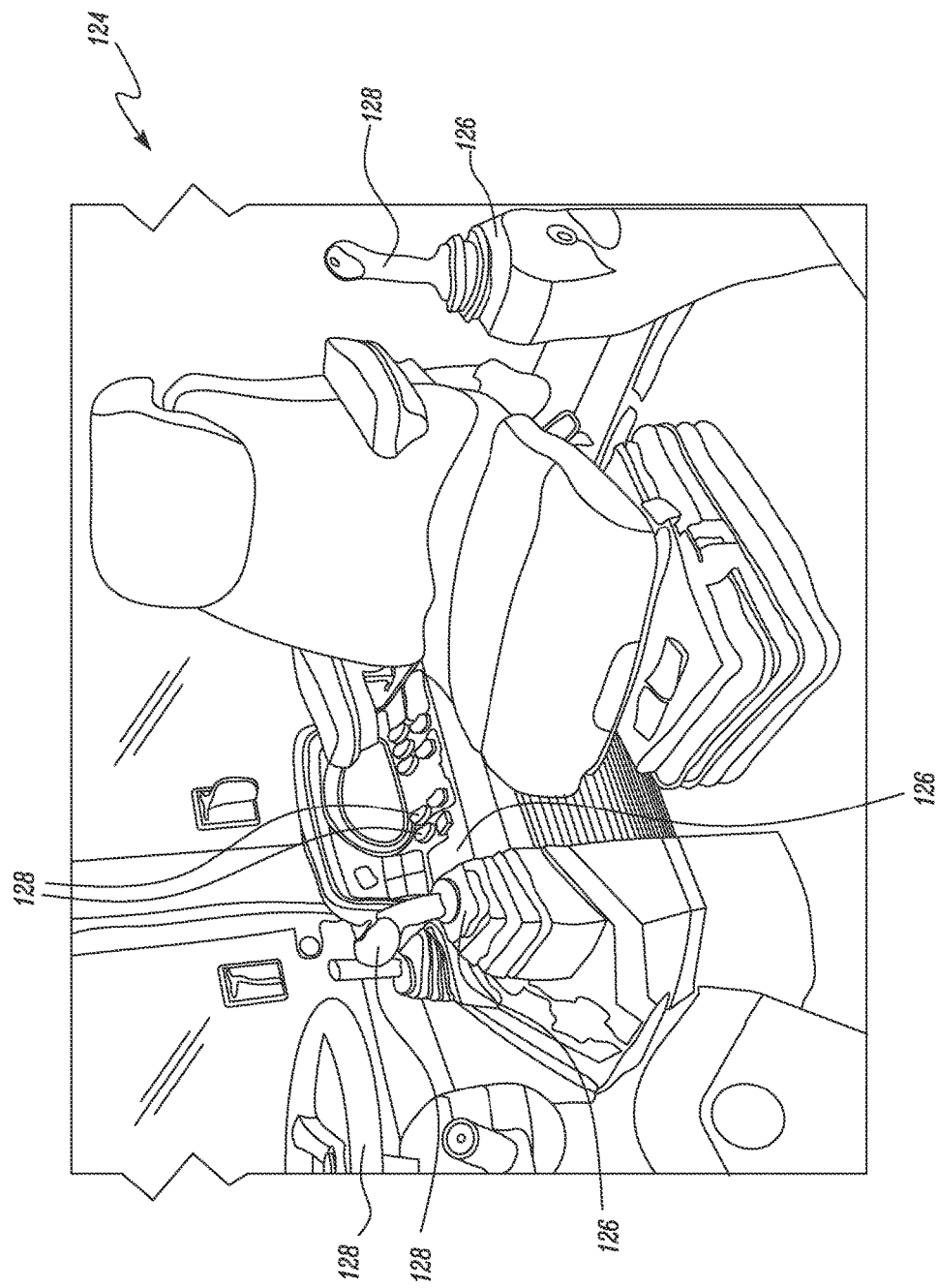
FIG. 4 is another interior view of the operator cabin showing the various input devices provided on the operator interface.

Referring to FIGS. 3 and 4, interior views of the operator cabin 124 representing the various input devices 128 provided on the operator interface 126 is illustrated. Further, referring to FIG. 5, the feedback representation module 206 mounted inside the operator cabin 124 and configured to represent the training associated with the simulation training level T1 is illustrated. Based on the selection of the simulation training level T1 by the operator, the training apparatus 202 is configured to function as a simulator device. In the simulation training level T1, the machine 100 is in the power off mode while the training apparatus 202 continues to function.

In the simulation training level T1, the training apparatus 202 is configured to provide the training on operating the implement of the machine 100 based on the position of the input device 128 on the operator interface 126. The training apparatus 202 is also configured to provide the training on controlling the one or more parameters of the machine 100 based on a state or the spatial position of the implement. Further, the feedback representation module 206 is configured to display the different spatial positions of the implement corresponding to the different positions of the input device 128 on the operator interface 126. In an embodiment, the feedback representation module 206 is the display screen provided inside the operator cabin 124. The training apparatus 202 is communicably coupled to the control system 208 of the machine 100 to represent the different spatial positions of the implement on the display screen. The spatial position of the implement corresponds to the different positions of the input device 128 on the operator interface 126.

Figure 5:
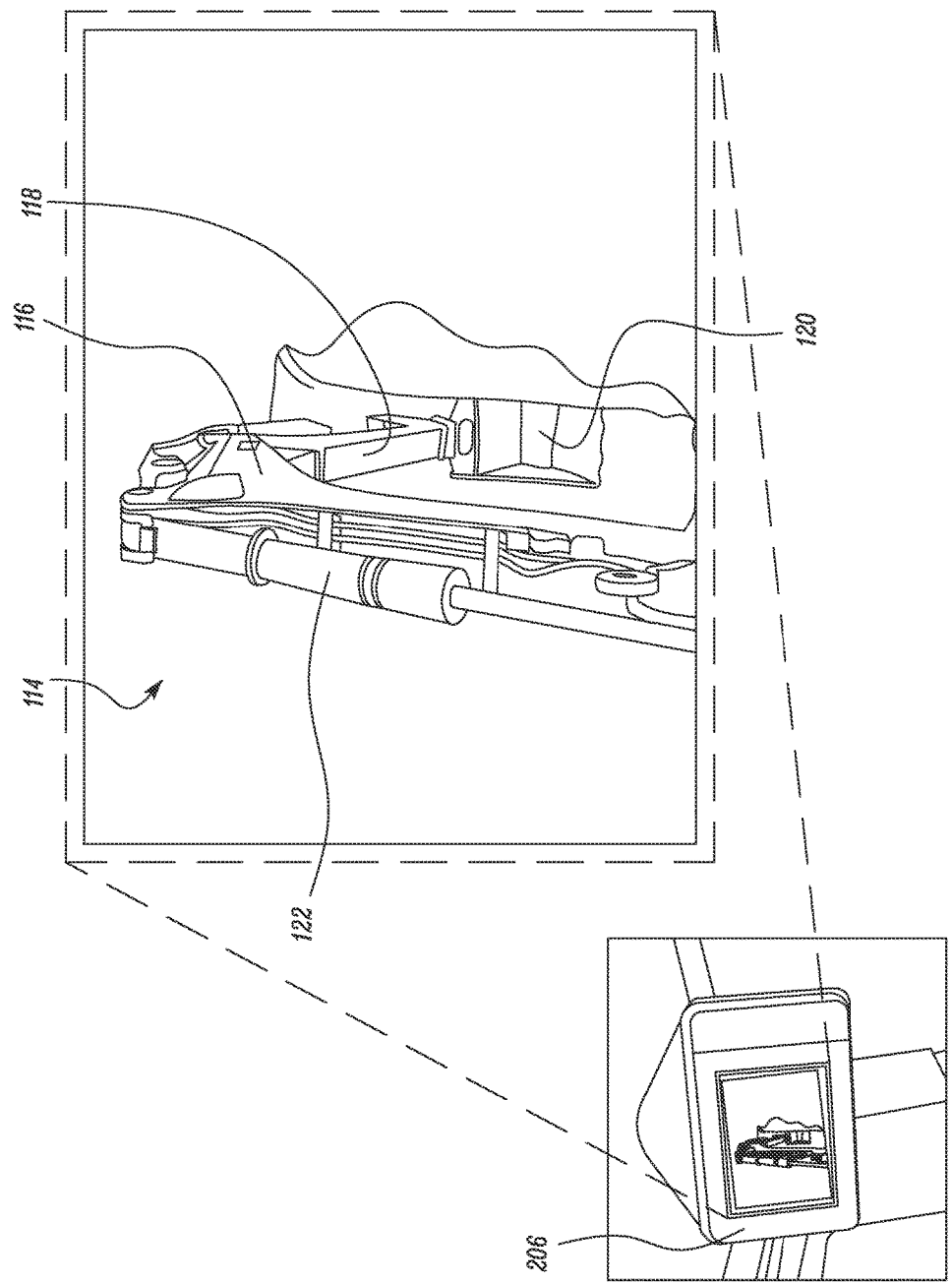
FIG. 5 is the interior view of the operator cabin showing a feedback representation module to represent training associated with a simulation training level.

As shown in the FIGS. 3 and 4 respectively, the operator may manipulate the input devices 128 for controlling the front and rear implement arrangements 106, 114. The training apparatus 202 is configured to generate a graphical representation of the front or rear implement arrangements 106, 114, as manipulated by the operator to be displayed on the feedback representation module 206, as shown in FIG. 5. The graphical representation may include a simulated representation of at least a part of a view observed from the operator cabin 124. Further, as the operator may change the position of the input devices 128, the graphical representation may change on the feedback representation module 206 to display the spatial movements virtually corresponding to the changed position of the input devices 128.

Further, the one or more parameters associated with the state of the implement may also be displayed on the feedback representation module 206. The state of the implement may be defined based on the operation performed by the implement. For example, in case of the machine 100 such as the backhoe loader, a hoe (implement) may be engaged in various states during a trenching operation. Further, the one or more parameters may include the engine speed, the power required and/or supplied to the front implement arrangement 106 and the like. When the operator may operate the input device 128 related to the implement, the graphical representation may change accordingly to display the implement on the feedback representation module 206.

Figure 6:
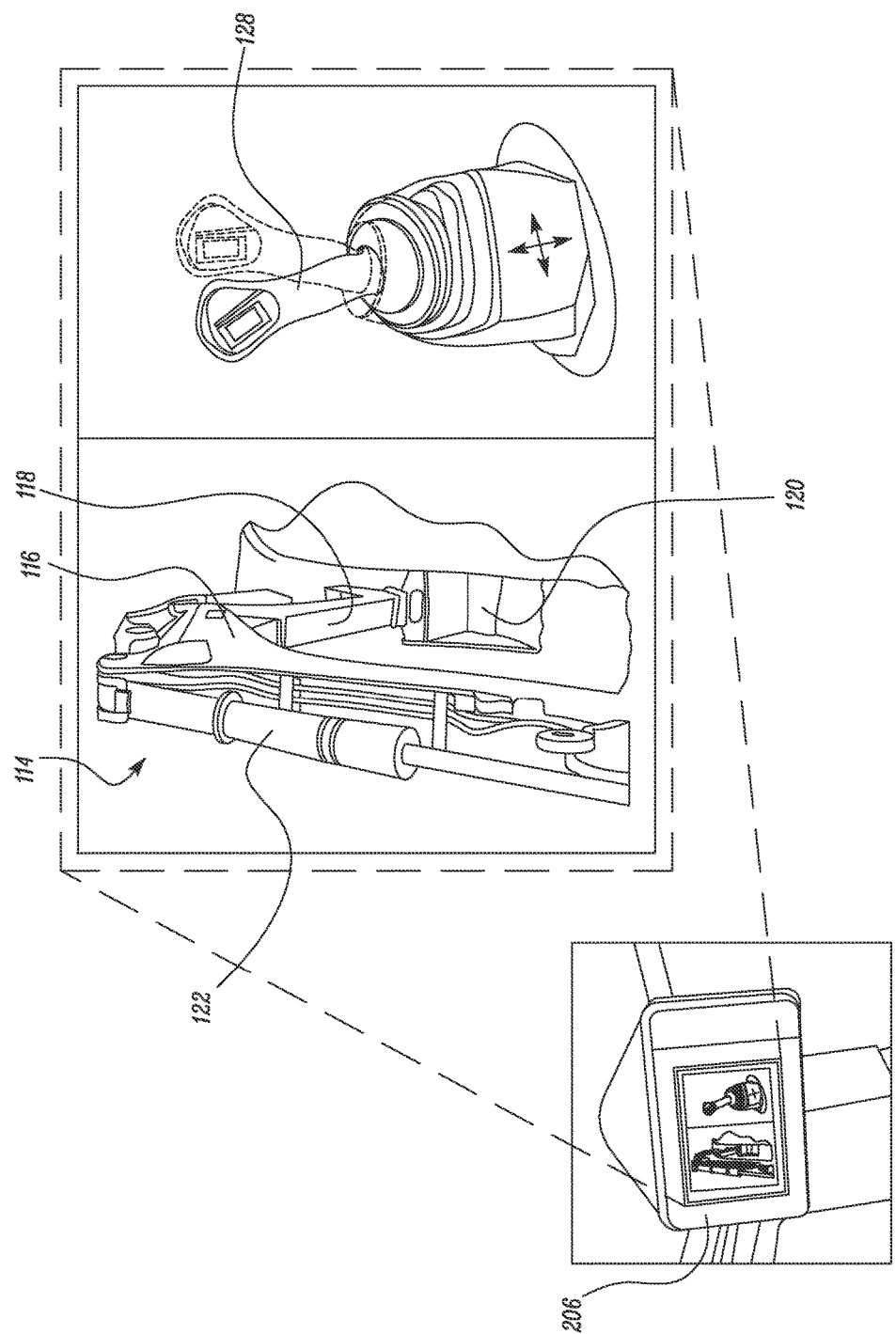
FIG. 6 is the interior view of the operator cabin showing the feedback representation module to represent a feedback associated with a direct feedback training level.

FIG. 6 is the interior view of the operator cabin 124 showing the feedback representation module 206 to represent the feedback associated with the direct feedback training level T2. Although, in FIG. 6, the feedback representation module 206 is represented as the onboard display screen, the feedback representation module 206 may also include the tactile feedback device, the indicator lights, the audio device or a combination thereof.

In an embodiment, the control system 208 may be configured to determine the desired operational time for the required operation to be completed by the front and/or rear implement arrangements 106, 114 of the machine 100. Also, the control system 208 may be configured to determine the sequence of commands/inputs required on the operator interface 126 to perform the required operation.

In the direct feedback training level T2, the training apparatus 202 is configured to provide the feedback to the operator on controlling the operational time of the implement of the machine 100 based on the position of the implement and/or the position of the input device 128 on the operator interface 126. In an embodiment, the position of the implement may be determined based on the various sensors including, but not limited to, the positional sensor, the speed sensor, the pressure sensor, and/or the flow sensor located on the machine 100. In another embodiment, the position of the implement is based on the position of the input device 128 and a lapsed time associated with the operation being executed by the implement. In another embodiment, the control system 208 communicably coupled with the training apparatus 202 may refer to a reference map or a historical data stored in the database to determine an optimum operational time associated with the execution of the operation being performed by the implement and/or the drivetrain of the machine 100.

In an embodiment, the training apparatus 202 is configured to provide the feedback to the operator to perform one or more tasks associated with the operation being executed by the implement and/or the drivetrain based on the desired operational time, and the position of the implement. For example, as shown in FIG. 6, the training apparatus 202 may provide the sequence of commands to the operator of the machine 100 such as the backhoe loader so that the implement or the drivetrain may be manipulated by means of performing those tasks on the operator interface 126 to produce a straight, flat, bottom trench. The training apparatus 202 may refer to the position of the hoe (implement) based on the operational lapsed time and the position of the input device 128 on the operator interface 126 and subsequently, provides a required command on the feedback representation module 206.

Further, in the direct feedback training level T2, the training apparatus 202 is also configured to provide the feedback to the operator on controlling the one or more parameters of the machine 100 based on the state of the implement executing the required operation. For example, when the implement may be performing a trenching operation, the training apparatus 202 provides the feedback on the feedback representation module 206 related to the desired one or more parameters associated with the trenching operation. The feedback may provide an indication to the operator to change one or parameters such as the engine speed, the gear selection, the power to the implement and the like. The feedback may also be related to changing the position of the input device 128 to prevent stalling of the boom 116, the torque convertor, the implement or any other component of the machine 100 for improving an efficiency of the machine 100 during the ongoing operation.

Figure 7:
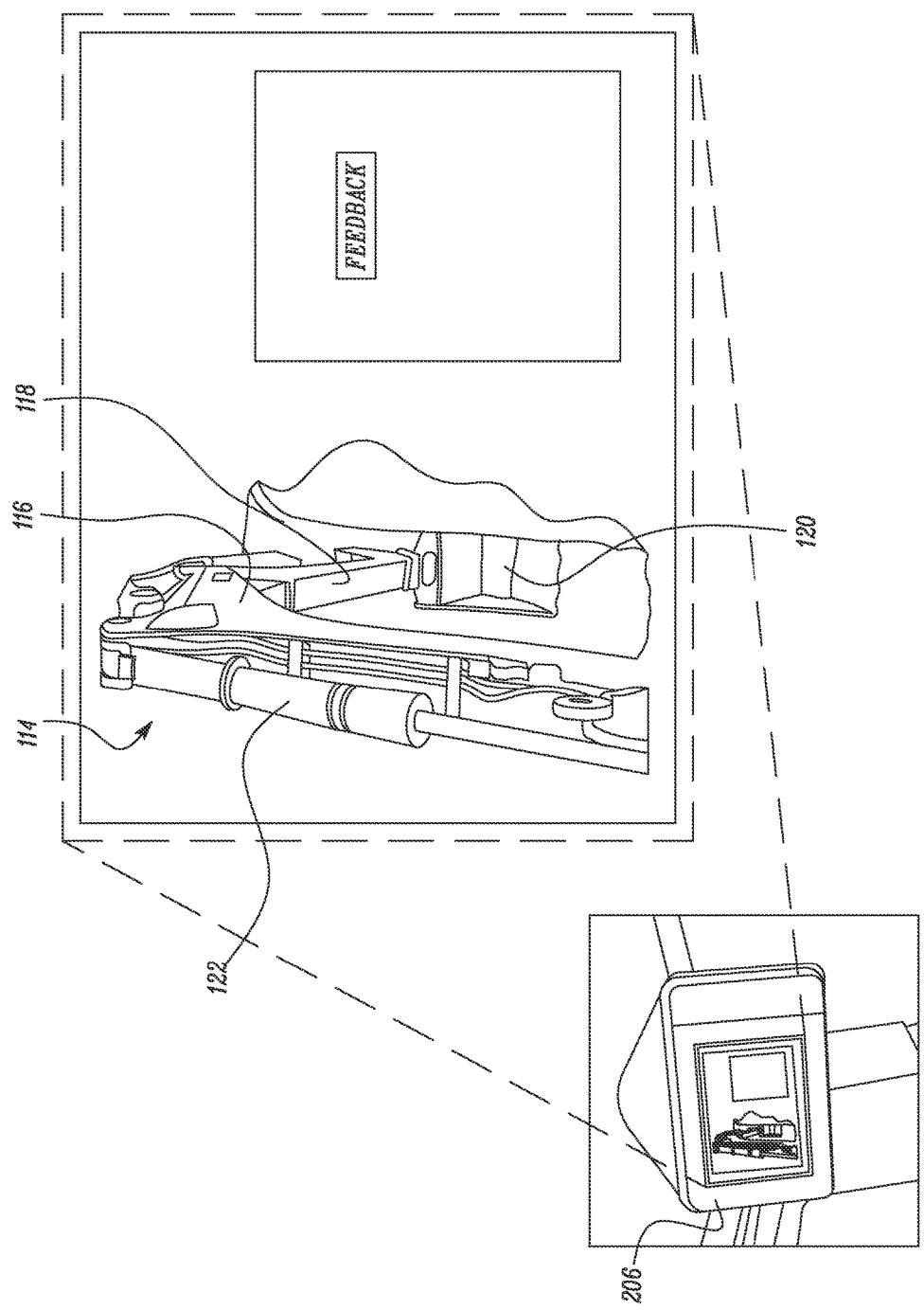
FIG. 7 is the interior view of the operator cabin showing the feedback representation module to represent the feedback associated with a corrective training level.

FIG. 7 is the interior view of the operator cabin 124 showing the feedback representation module 206 to represent the feedback associated with the corrective training level T3. Although, in the FIG. 7, the feedback representation module 206 is represented as the onboard display screen, the feedback representation module 206 may also include the tactile feedback device, the indicator lights, the audio device or a combination thereof.

In the corrective training level T3, the training apparatus 202 provides the feedback to the operator about the corrective action performed by the control system 208 over and above the operator inputs provided to execute the required operation. The corrective action may be performed on correcting the spatial position of the implement for performing the required operation, on the operational time of the implement to perform the required operation, and the one or more parameters of the machine 100 associated with the execution of the required operation. The feedback representation module 206 may provide a real time feedback to the operator of the corrective actions performed by the control system 208 over and above the operator inputs received through the input devices 128 on the operator interface 126. In an embodiment, the real time feedback provides a deviation in executing the operations performed by the implement of the machine 100 between the direct feedback training level T2 and the corrective training level T3.

For example, when the operator is performing the trenching operation, the control system 208 may receive feedback from the various sensors to determine the position of the implement and accordingly, as required, performs the corrective action to change the spatial position of the implement to achieve the required features as desired by the trenching operation. The control system 208 may also perform the corrective action on the one or more parameters associated with the machine 100 based on information received from the various sensors. The one or more parameters may include the engine speed, the throttle selection, the gear selection, the brake selection and the like.

The feedback representation module 206 represents the corrective action performed by the control system 208 to the operator. Specifically, the corrective action is represented as a correction performed by the control system 208 on the operator inputs provided through the input devices 128 on the operator interface 126. The training apparatus 202 may provide the above feedback in form of the textual, graphical and/or audible instructions to notify the operator of the corrective action being performed.

INDUSTRIAL APPLICABILITY

The present disclosure relates to the training apparatus 202 located onboard the machine 100. Due to the onboard location of the training apparatus 202, a need of a separate dedicated training apparatus is eliminated resulting in substantial system cost reduction.

The training apparatus 202 may be used to provide various levels of the training to the operator depending on a skill level of the operator. For example, different training levels may be specifically designed and configured for training novice and experienced operators. As illustrated in the given embodiment, the simulation training level T1 is used to provide the training to beginners or the novice operators. The direct feedback training level T2 is advancement over the simulation training level T1. The direct feedback training level T2 is used to provide the feedback and/or the training to the operators having some experience but with limited skills for performing the required operation. The corrective training level T3 is a further advancement over the direct feedback training level T2 and is used to provide the corrective action with the feedback for training the experienced operators for performing the required operation.

The training apparatus 202 may also be used to provide the training to the operator related to various operations. The operations may include, but not limited to, craning, hammer work, digging, working with an extended boom 116, material loading and so on. The training apparatus 202 may also be used to provide the training to the operator related to optimization of the one or more parameters such as the engine speed, the power required for the ongoing operation, fuel consumption and so on.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A training apparatus on board a machine, the training apparatus comprising:
   a feedback representation module configured to provide a feedback to an operator of the machine;
   an operator interface having an input device for controlling at least one parameter of the machine and an implement of the machine; and
   a selector module configured to receive a training level selection from the operator,
   wherein the training apparatus is configured to effect a direct feedback training level in response to the direct feedback training level being selected as the training level selection via the selector module, and
   wherein, according to the direct feedback training level, the training apparatus is further configured to
      convey a control input from the input device to the implement of the machine while the machine is running,
      determine a desired operational time for a required operation to be completed by the implement of the machine,
      determine a sequence of control inputs via the operator interface to effect the required operation of the implement of the machine based on the desired operational time for the required operation, and
      communicate the sequence of control inputs to the operator via the feedback representation module during performance of the required operation, such that the operator may perform the required operation with guidance from the sequence of control inputs communicated via the feedback representation module.

2. The training apparatus of claim 1, wherein the training apparatus is communicably coupled to a control system, the control system being configured to:
- determine a spatial position of the implement corresponding to a position of the input device on the operator interface;
- determine the at least one parameter of the machine corresponding to a position of the input device on the operator interface; and
- determine the sequence of control inputs based on the desired operational time and the spatial position of the implement.

3. The training apparatus of claim 1, wherein the feedback representation module comprises at least one of a display screen, an audio device, indicator lights, and a tactile feedback device.

4. The training apparatus of claim 1, wherein the feedback representation module is configured to display different spatial positions of the implement corresponding to various positions of the input device on the operator interface.

5. The training apparatus of claim 1, wherein the direct feedback training level is configured to provide the feedback to the operator on at least one of the following:
- controlling an operational time of the implement of the machine based on at least one of:
  - a spatial position of the implement and a position of the input device on the operator interface of the machine, and
  - the desired operational time; and
- controlling the at least one parameter of the machine based on a state of the implement.

6. The training apparatus of claim 5, wherein the feedback representation module is configured to provide an instruction to the operator for performing a task in accordance with the feedback.

7. The training apparatus of claim 6, wherein the task comprises at least one of a change in a position of the input device and a change in an output of the at least one parameter.

8. The training apparatus of claim 1, wherein the training apparatus is further configured to effect a simulation training level in response to the simulation training level being selected as the training level selection via the selector module, and
- wherein, according to the simulation training level, the training apparatus is further configured to
  - convey the control input from the input device to a simulation of the machine while the machine is in a power off mode, and
  - update a representation of the machine on the feedback representation module in response to the control input.

9. The training apparatus of claim 1, wherein the training apparatus is further configured to effect a corrective training level in response to the corrective training level being selected as the training level selection via the selector module, and
- wherein, according to the corrective training level, the training apparatus is further configured to
  - receive the control input from the input device while the machine is running,
  - effect a corrective action by modifying the control input from the input device, thereby generating a modified control input, and convey the modified control input to the implement of the machine, and
  - communicate the corrective action to the operator of the machine, via the feedback representation module, by communicating a difference between the control input from the input device and the modified control input.

10. The training apparatus of claim 9, wherein the training apparatus is further configured to effect a simulation training level in response to the simulation training level being selected as the training level selection via the selector module, and
- wherein, according to the simulation training level, the training apparatus is further configured to
  - convey the control input from the input device to a simulation of the machine while the machine is in a power off mode, and
  - update a representation of the machine on the feedback representation module in response to the control input.

11. The training apparatus of claim 9, wherein the corrective training level is further configured to provide the feedback to the operator about the corrective action performed based on the control input from the input device directed to at least one of the following:
- a corrective action on at least one desired parameter of the machine to perform an operation associated with the implement of the machine;
- a corrective action on a spatial position of the implement for performing the operation; and
- a corrective action on an operational time required to perform the operation associated with the implement of the machine.

12. The training apparatus of claim 11, wherein the feedback representation module is configured to provide a real time feedback to the operator when the machine is performing the corrective action based on the control input from the input device.

13. A machine comprising:
- an implement for performing one or more operations associated with the machine, the implement being electro-hydraulically controlled;
- an operator interface having an input device to control at least one parameter of the machine and the implement;
- a control system configured to determine at least one of:
  - a spatial position of the implement based on a position of the input device on the operator interface; and
  - a desired operational time associated with an operation to be completed by the implement of the machine; and
- a training apparatus communicably coupled to the control system and the operator interface, the training apparatus comprising:
  - a feedback representation module configured to provide a feedback to an operator of the machine; and
  - a selector module configured to receive a training level selection from the operator,
- wherein the training apparatus is configured to effect a direct feedback training level in response to the direct feedback training level being selected as the training level selection via the selector module, and
- wherein, according to the direct feedback training level, the training apparatus is further configured to
  - convey a control input from the input device to the implement of the machine while the machine is running,
  - determine a sequence of control inputs via the operator interface to effect the operation of the implement of the machine based on the desired operational time for the operation, and communicate the sequence of control inputs to the operator via the feedback representation module during performance of the operation, such that the operator may perform the operation with guidance from the sequence of control inputs communicated via the feedback representation module.

14. The machine of claim 13, wherein the feedback representation module is configured to display different spatial positions of the implement corresponding to various positions of the input device on the operator interface.

15. The machine of claim 13, wherein the direct feedback training level is configured to provide the feedback to the operator on at least one of the following:
controlling the at least one parameter of the machine based on a state of the implement; and
controlling an operational time of the implement of the machine based on at least one of:
the spatial position of the implement and a position of the input device on the operator interface of the machine, and
the desired operational time.

16. The machine of claim 15, wherein the feedback representation module is configured to provide an instruction to the operator for performing the operation in accordance with the feedback.

17. The machine of claim 16, wherein the operation comprises at least one of a change in a position of the input device and change in an output of the at least one parameter.

18. The machine of claim 13, wherein the training apparatus is further configured to effect a corrective training level in response to the corrective training level being selected as the training level selection via the selector module, and
wherein, according to the corrective training level, the training apparatus is further configured to
receive the control input from the input device while the machine is running,
effect a corrective action by modifying the control input from the input device, thereby generating a modified control input, and convey the modified control input to the implement of the machine, and
communicate the corrective action to the operator of the machine, via the feedback representation module, by communicating a difference between the control input from the input device and the modified control input.

19. The machine of claim 18, wherein the corrective training level is further configured to provide the feedback to the operator about the corrective action performed based on the control input from the input device directed to at least one of the following:
a corrective action on at least one desired parameter of the machine to perform the operation associated with the implement of the machine;
a corrective action on a spatial position of the implement for performing the operation; and
a corrective action on an operational time required to perform the operation associated with the implement of the machine.

20. The machine of claim 13, wherein the training apparatus is further configured to effect a simulation training level in response to the simulation training level being selected as the training level selection via the selector module, and
wherein, according to the simulation training level, the training apparatus is further configured to
convey the control input from the input device to a simulation of the machine while the machine is in a power off mode, and
update a representation of the machine on the feedback representation module in response to the control input.

* * * * *